United States Patent [19]
Devenyi

[11] Patent Number: 5,384,871
[45] Date of Patent: Jan. 24, 1995

[54] FIBER OPTIC COUPLINGS AND MEASUREMENT APPARATUS USING FLEXIBLE LIQUID FILLED BLADDER

[75] Inventor: Gabor Devenyi, West Penetang, Canada

[73] Assignee: Hughes Aircraft Company, Los Angeles, Calif.

[21] Appl. No.: 152,156

[22] Filed: Nov. 15, 1993

[51] Int. Cl.$^6$ .............................................. G02B 6/00
[52] U.S. Cl. .......................................... 385/19; 385/39
[58] Field of Search ....................... 385/19, 25, 27, 31, 385/39, 42, 43

[56] References Cited

U.S. PATENT DOCUMENTS

| | | | |
|---|---|---|---|
| 3,455,625 | 7/1969 | Brumley et al. | 385/39 X |
| 3,704,996 | 12/1972 | Borner et al. | 385/39 X |
| 3,936,142 | 2/1976 | Kersten | 385/39 |
| 4,245,886 | 1/1981 | Kolodzey et al. | 385/25 X |
| 4,384,761 | 5/1983 | Brady et al. | 385/19 X |
| 4,505,539 | 3/1985 | Auracher et al. | 385/19 |
| 4,557,555 | 12/1985 | Stoerk et al. | 385/25 X |
| 5,004,318 | 4/1991 | Ohashi | 385/19 |

*Primary Examiner*—Akm E. Ullah
*Attorney, Agent, or Firm*—Michael W. Sales; Wanda K. Denson-Low

[57] ABSTRACT

An optical coupler (20) is provided for joining first and second opposed fiber optic ends (22, 24). A flexible tubular bladder (30) has first and second opposed ends (32, 34). The first end (32) is sealingly attached to the first fiber optic end (22) and the second end (34) is sealingly attached to the second fiber optic end (24). A light transmissive liquid completely fills a cavity (42) within the bladder (30) enabling transmission of light signals between the first and second fiber optic ends (22, 24). The bladder (30) is deformable to thereby attenuate light signals being transmitted through the light transmissive liquid. This may be achieved by means of a mechanical clamp (46) engageable with the outer peripheral surface of the bladder, by a mechanical iris assembly (52), or by a pressurized atmosphere (FIG. 5) applied to selectively reduce the cross sectional area of the cavity to a desired percentage of the initial cross sectional area. This may also be achieved by use of an elongate member (88) wrapped around the outer peripheral surface of the bladder (30) and having opposed ends (90, 92) which can be manipulated to alter the cross sectional area of the cavity. Apparatus using the optical coupler can be used to measure relative movement between a pair of members, as well as a pressure sensor.

13 Claims, 2 Drawing Sheets

FIBER OPTIC COUPLINGS AND MEASUREMENT APPARATUS USING FLEXIBLE LIQUID FILLED BLADDER

BACKGROUND OF THE INVENTION

1. Field of the Invention

The present invention relates generally to light transmission utilizing fiber optics and, more particularly, to a unique coupling device between opposed ends of a pair of fiber optic cables utilizing a flexible tubular bladder sealingly attached to the opposed fiber optic ends and filled with light transmitting optical oil.

2. Description of the Prior Art

Known uncoupling devices for splicing ends of fiber optic cables have tended to be bulky and relatively expensive. It is normally required that the ends of the fiber optic cables be carefully machined and polished. Additionally, it is customary to use elaborate mechanical iris assemblies to control light transmission and these are inherently complicated and difficult to seal. Hence, in the past, designers would go to great lengths to avoid splicing fiber optic cables if at all possible.

It was also customary for conventional fiber optic couplings to rely on precision optical alignment in order to produce efficient light transmission between fiber optic cables.

It was in light of this state of the prior art that the present invention was conceived as a low cost alternative and has now been reduced to practice.

SUMMARY OF THE INVENTION

According to the invention, an optical coupler is provided for joining first and second opposed fiber optic ends. A flexible tubular bladder has first and second opposed ends. The first end is sealingly attached to the first fiber optic end and the second end is sealingly attached to the second fiber optic end. A light transmissive liquid completely fills a cavity within the bladder enabling transmission of light signals between the first and second fiber optic ends. The bladder is deformable to thereby attenuate light signals being transmitted through the light transmissive liquid. This may be achieved by means of a mechanical clamp engageable with the outer peripheral surface of the bladder or by a pressurized atmosphere applied to selectively reduce the cross sectional area of the cavity to a desired percentage of the initial cross sectional area. This may also be achieved by use of an elongate member wrapped around the outer peripheral surface of the bladder and having opposed ends which can be manipulated to alter the cross sectional area of the cavity. Apparatus using the optical coupler can be used to measure relative movement between a pair of members, as well as a pressure sensor.

The light transmissive liquid is preferably an optical oil which has an index of refraction which is generally similar to that of the fiber optic cables which it couples. The liquid coupling thereby provided "matches" the incoming fibers without the need for precision alignment providing a flexible and variable cross section for the light to pass through. The coupling of the invention enhances the contact between the incoming fiber cables through the optically transmitting liquid which essentially becomes a "liquid fiber" section conforming to the imperfect and unpolished edges of the fiber optic cables.

A primary purpose of the invention is to provide an inexpensive coupling for optically connecting a pair of optical fiber cables in end-to-end relationship.

Another object of the invention is to provide such a coupling which does not require precision alignment of the cables nor highly machined end surfaces on the fiber optic cables being joined.

A further object of the invention is to provide such a coupling which utilizes a flexible tubular bladder whose opposed ends are sealingly attached to the ends of a pair of fiber optic cables, the tubular bladder being filled with a light transmissive liquid capable of transmitting light signals between the fiber optic cables.

Still another object of the invention is to provide such an optical coupler in which the bladder can be deformed to thereby attenuate light signals being transmitted through the light transmissive liquid.

Yet another object of the invention is to provide such an optical coupler in which a pressure can be applied to the outer peripheral surface of the bladder to selectively reduce the cross sectional area of the cavity and thereby attenuate light signals being transmitted through the light transmissive liquid.

Yet a further object of the invention is to provide such apparatus in which the pressure being applied to the bladder is correlated with the magnitude of a light signal being received by an optical signal receiving means.

Other and further features, advantages will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate some of the embodiments of the invention and, together with the description, serve to explain the principles of the invention in general terms. Like numerals refer to like parts throughout the disclosure.

DETAILED DESCRIPTION OF THE DRAWINGS

Figure 1:
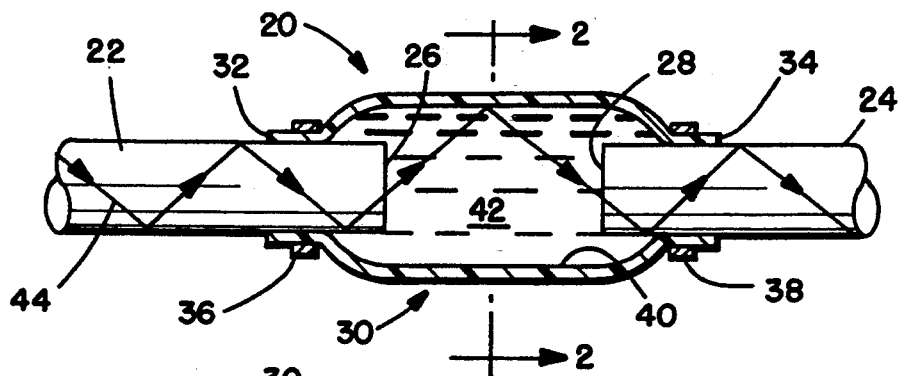
FIG. 1 is a detail side elevation view of an optical coupler embodying the present invention, certain parts being cut away and shown in section for clarity.

Turn now the drawings and, initially, to FIG. 1 which depicts an optical coupler 20 which generally embodies the present invention. A pair of opposed ends 22, 24 of fiber optic cables extend to extreme end surfaces 26, 28 respectively. The optical coupler 20 includes a flexible tubular bladder 30 which has opposed ends 32, 34. The bladder 30 may be composed of polyurethane or other suitable flexible plastic material.

The end 32 is sealingly attached to the first end 22 by means of a snap ring 36 or in some other suitable manner. In a similar fashion, end 34 of the bladder 30 is sealingly attached to the second end 24, for example, by means of a snap ring 38. The seal thereby provided between the ends 32, 34 of the bladder and the associated ends 22, 24 of the fiber optic cables is both gas tight as well as liquid tight.

Figure 2:
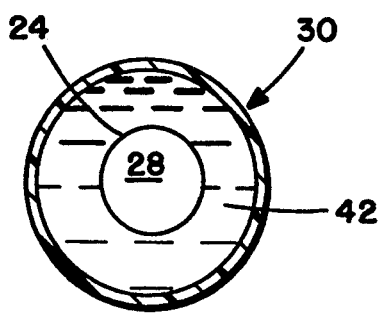
FIG. 2 is a cross section view taken generally along line 2—2 in FIG. 1.

The bladder 30 has an interior surface 40 which defines a cavity 42 which extends between the extreme end surfaces 26, 28 and the interior surface 40. The cavity 42 has an initial cross sectional area which is most clearly depicted in FIG. 2. A clear, pure, light transmissive liquid, preferably an optical oil having an index of refraction similar to that of the first and second ends 22, 24 of fiber optic cables, completely fills the cavity 42 and is capable of transmitting light signals between the first and second ends 22, 24. Such a commercially available optical oil which has been found acceptable for purposes of the invention is referred to as Immersion Liquid, Code 1160, Wavelength: 5893, Refraction Index: N1.5151, and is sold by Cargille Laboratories of Cedar Grove, N.J.

Figure 3:
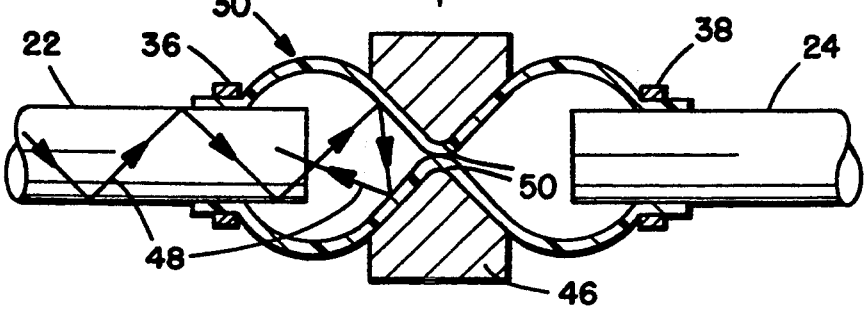
FIG. 3 is a detail side elevation view, similar to FIG. 1, diagrammatically illustrating a mechanical operation on the optical coupler to produce attenuation of an optical signal.

A suitable operating mechanism is utilized for deforming the bladder 30 to thereby attenuate light signals which are represented by arrows 44 transmitted through the light transmissive liquid in the cavity 42. As depicted in FIG. 3, such an operating mechanism may take the form of opposed mechanical clamp members 46 which engage the outer peripheral surface of the bladder 30. As clamping proceeds, the cross sectional area of the bladder in the plane of engagement by the clamp members 46 continues to diminish, reducing the intensity of the light signals received and transmitted by the fiber optic end 24. Such diminishment continues until light signals represented by the arrows 48 are no longer transmitted to the fiber optic end 24, but are reflected back toward their source (not illustrated in FIG. 3). It will be appreciated that the clamp members 46 can be operated to reduce the cross sectional area of the cavity 42 to any desired percentage of the initial cross sectional area.

Figure 4:
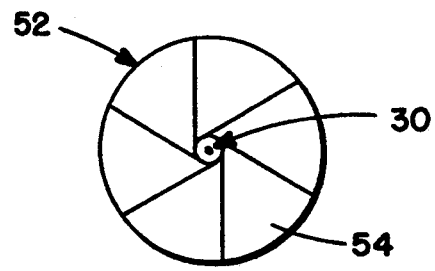
FIG. 4 is a detail elevational view of another mechanism for producing attenuation of an optical signal.

While the clamp members 46 employ opposed straight edges 50 for engaging the outer peripheral surface of the bladder 30, it may be desirable, in the alternative, to employ a mechanical iris clamping assembly 52 as depicted in FIG. 4. In this instance, a plurality of leaf segments 54 would be caused to engage the outer peripheral surface of the bladder 30 at a plurality of circumferential locations. In the same manner as the clamp members 46, the leaf segments 54 would operate to selectively reduce the cross sectional area of the cavity 42 at the location of engagement to a desired percentage of the initial cross sectional area of the bladder.

Figure 5:
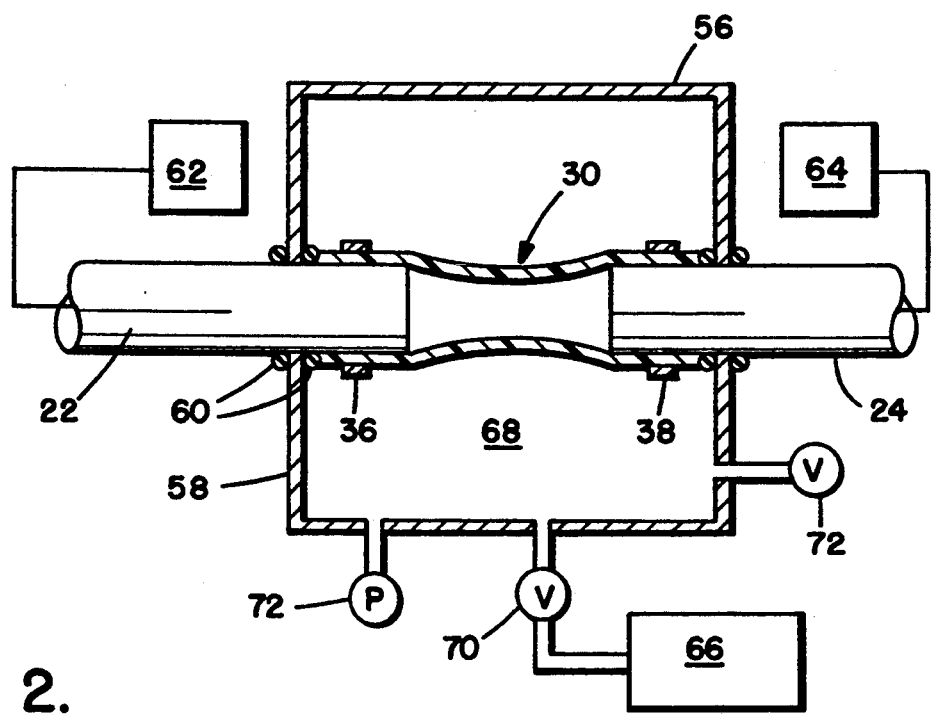
FIG. 5 is a diagrammatic side elevation view of another embodiment of the invention for producing attenuation of an optical signal.

Instead of mechanically engaging the outer peripheral surface of the bladder 30, it may be desirable to subject the bladder to a pressurized atmosphere to obtain its deformation, again resulting in attenuation of light signals being transmitted through the light transmissive fluid within the cavity 42. Such an arrangement is depicted in FIG. 5. In this instance, a housing 56 capable of containing gas under pressure is provided to encompass the outer peripheral surface of the bladder 30. The housing 56 is diagrammatically illustrated as having side walls 58 which engage the first and second ends 22, 24 of the optical fiber cables with gas tight integrity being assured by means of O-ring seals 60. The first end 22 is optically connected to an optical signal generator 62 and the second end 24 is optically connected to an optical signal receiver 64.

A source 66 of pressurized gas may be selectively introduced into an interior space 68 within the housing 56 to impart a pressure against the outer peripheral surface of the bladder 30. A valve 70 is operable to control the flow of pressurized gas into the space 68. In this embodiment, a valve 72 is operable to purge the pressurized gas from the interior space 68, and a pressure gauge 72 provides the operator with an indication of the pressure within the housing 56.

As pressure within the interior space 68 is increased, resulting in deformation of the bladder 30 and diminution of its cross sectional area intermediate the end surfaces 26, 28, the light signal received by the receiver 64 will become ever smaller. As a result, it is possible to calibrate the system depicted in FIG. 5, there being a correlation between the pressure being imparted to the interior space 68 and the light signal being received by the receiver 64.

Figure 6:
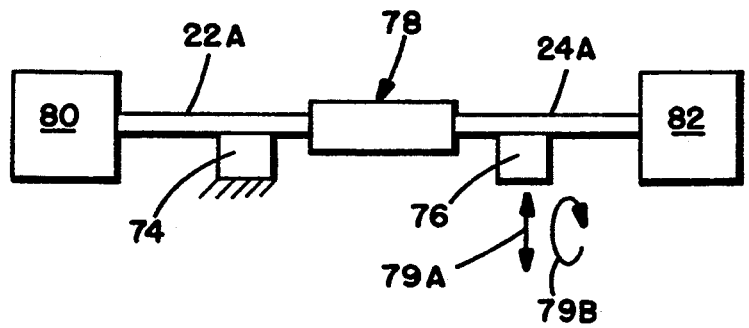
FIG. 6 is a diagrammatic illustration of a system utilizing the invention to measure relative movement between a pair of independent members.

The invention can also be utilized to enable measurement of relative movement between a pair of independent members 74, 76. FIG. 6 depicts such an arrangement. In this instance, a first end 22A of a fiber optical cable is mounted on the member 74 and a second end 24A of an optical fiber cable is mounted on the member 76. An optical coupler 78, similar in all respects to the optical coupler 20, is suitably attached to the first and second ends 22A, 24A, respectively. An optical signal generator 80 is a source of light signals to be transmitted to an optical signal receiver 82 via the fiber optic cables depicted by the first and second ends 22A, 24A and their associated optical coupler 78.

Figure 7:
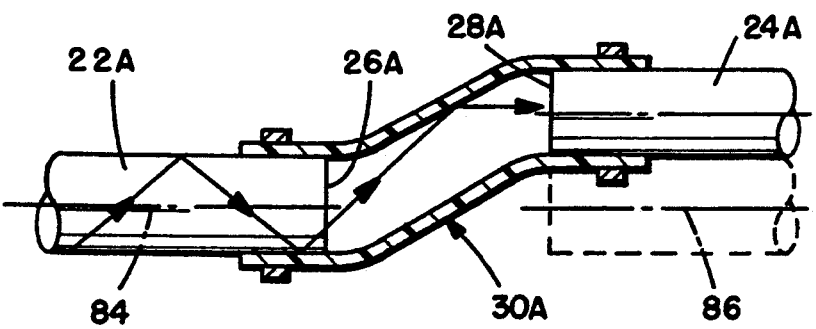
FIG. 7 is a side elevation view, partly in section, illustrating measurement of translational movements between a pair of independent members using the system of FIG. 6, with such translational movement being exaggerated for the sake of clarity.

Relative movement between the members 74, 76 may be by way of translation (represented by a double ended arrow 79A) or by way of rotation (represented by an arcuate arrow 79B). Relative translational movement is depicted in FIG. 7. When the first end 22A is aligned with the second end 24A (as depicted by dashed lines) such that a center line 84 of the former is coincident with a center line 86 of the latter, the light signal received by the receiver 82 has a maximum magnitude. In this instance, extreme end surfaces 26A, 28A are mutually coextensive so that substantially all of the light rays passing through the first end 22A pass into and through the second end 24A. Should the extreme end surfaces 26A, 28A not be perpendicular to their associated center lines 84, 86, that is, the longitudinal axes of the fiber optic cables terminating at the ends 22A, 24A, that would not have an adverse effect on the outcome of operating according to the invention. Even if the end surfaces 26A, 28A are of a roughened nature or lie in planes which are substantially oblique relative to the center lines 84, 86, there would be no adverse effect on optical transmission through the optical coupler. Rather, what is of importance is the relationship of projections from the end surfaces 26A, 28A of surfaces which are perpendicular to the center lines 84, 86. Thus, there would be no light transmission to be received by the optical signal receiver 82 when the relative positions of the ends 22A, 24A is indicated in the manner depicted by solid lines in FIG. 7. In this instance, the projected surfaces of the first and second ends 22A, 24A are translationally displaced so that projections of their end surfaces 26A, 28A are not co-extensive. By the same token, when the centerlines 84, 86 are aligned, total light transmission occurs through the optical coupler.

Figure 8:
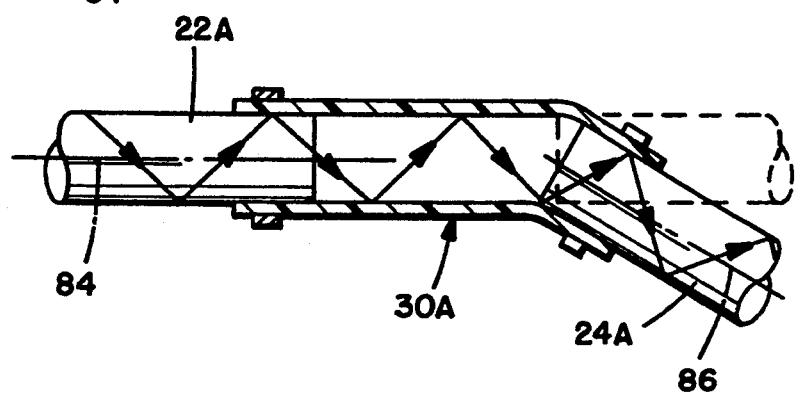
FIG. 8 is a side elevation view, partly in section, for illustrating measurement of rotational movements between pair of independent members utilizing the system FIG. 6, with such rotational movement being exaggerated for the sake of clarity.

The situation in which relative rotational movement between the members 74, 76 (FIG. 6) occurs is depicted in FIG. 8. In this instance, the longitudinal axes 84, 86 become mutually angularly placed and when a predetermined angle of displacement is reached, the receiver 82 no longer receives a signal. This might occur when the second end 24A reaches the solid line position indicated in FIG. 8. Between that position and the dashed line position depicted in FIG. 8, the magnitude of the signal received by the receiver 82 would be proportional to the extent of angular displacement.

Figure 9:
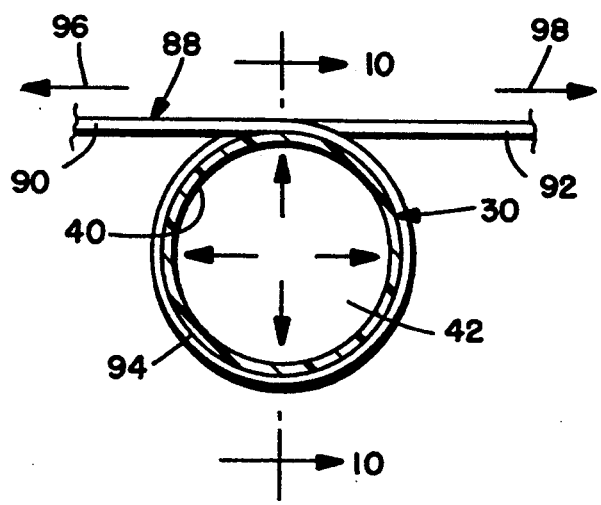
FIG. 9 is a detail cross section view illustrating another embodiment of the invention.
Figure 10:
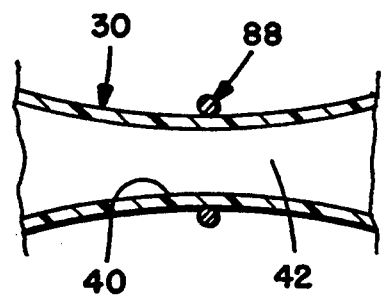
FIG. 10 is a cross section view taken generally along line 10—10 in FIG. 9.

Another embodiment of the invention is illustrated in FIGS. 9 and 10 which illustrate another mechanism for deforming the bladder 30 to thereby attenuate light signals being transmitted through the light transmissive liquid. In this instance, an elongate member 88 which may be cord, tape or other suitable material has opposed ends 90, 92 and is wrapped around the outer peripheral surface of the bladder to form a loop 94 which is engaged with the outer peripheral surface. The light transmissive fluid within the cavity 42 generally biases the interior surface 40 outwardly so as to tend to increase the cross sectional area of the cavity. However, when one or both of the opposed ends 90, 92 are drawn in the directions of the arrows 96, 98, respectively, this serves to reduce the size of the loop 94 thereby reducing the cross sectional area of the cavity in the plane of the elongate member 88. This operation, therefore, serves to attenuate light signals between the first and second ends 22, 24 in the manner previously described.

While preferred embodiments of the invention have been disclosed in detail, it should be understood by those skilled in the art that various other modifications may be made to the illustrated embodiments without departing from the scope of the invention as described in the specification and defined in the appended claims.

I claim:

1. An optical coupler for joining first and second opposed fiber optic ends comprising:
   a flexible bladder having first and second opposed ends, said first end sealingly attached to said first fiber optic end, said second end sealingly attached to said second fiber optic end, said tubular bladder having an outer peripheral surface and an interior surface defining a cavity extending between said first and second fiber optic ends and having an initial cross sectional area; and
   a light transmissive liquid completely filling the cavity of said bladder for transmitting light signals between said first and second fiber optic ends.

2. An optical coupler as set forth in claim 1 including:
   operating means for deforming said bladder to thereby attenuate light signals being transmitted through said light transmissive liquid.

3. An optical coupler as set forth in claim 2 wherein said operating means includes a mechanical clamp engageable with said outer peripheral surface of said bladder for selectively reducing the cross sectional area of the cavity to a desired percentage of the initial cross sectional area.

4. An optical coupler as set forth in claim 2 wherein said operating means includes:
   a housing encompassing said outer peripheral surface of said bladder, said housing defining an interior space; and
   a source of pressurized gas for selective introduction into the interior space for imparting a pressure against the outer peripheral surface of said bladder and thereby selectively reducing the cross sectional area of the cavity therein to a desired percentage of the initial cross sectional area.

5. Apparatus for measuring relative movement between first and second members comprising:
   optical signal generating means;
   first fiber optic means on the first member having an index of refraction and adapted to transmit an optical signal from said optical signal generating means, said first fiber optic means having a longitudinal axis and having a first free end with a projected surface transverse of the longitudinal axis, said projected surface being distant from said optical signal generating means;
   optical signal receiving means distant from said optical signal generating means;
   second fiber optic means on the second member having an index of refraction substantially similar to said first fiber optic means adapted to transmit an optical signal to said optical signal receiving means, said second fiber optic means having a longitudinal axis and having a second free end with a projected surface transverse of the longitudinal axis, said projected surface being distant from said optical signal receiving means;
   flexible optical coupling means comprising a liquid filled bladder joining said first and second free ends, said optical coupling means being light transmissive and having substantially the same index of refraction as said first and second fiber optic means;
   said first and second fiber optic means being relatively movable between first and second extreme positions;
   whereby, in the first extreme position, with the longitudinal axes of said first and second fiber optic means being aligned, an optical signal of maximum magnitude is received by said optical signal receiving means from said optical signal generating means via said first fiber optic means, said optical coupling means, and said second fiber optic means; and
   whereby, in the second extreme position with the longitudinal axes of said first and second fiber optic means being misaligned, no optical signal is received by said optical signal receiving means.

6. Apparatus as set forth in claim 5 wherein, in the second extreme positions, the longitudinal axes of said first and second fiber optic means are parallel and mutually translationally displaced so that said projected surfaces of said first and second fiber optic means are non-extensive.

7. Apparatus as set forth in claim 5 wherein, in the second extreme position, the longitudinal axes of said first and second fiber optic means are mutually angularly displaced so that said projected surfaces of said first and second fiber optic means are non-extensive.

8. Apparatus as set forth in claim 5 wherein said optical coupling means includes:
- a flexible tubular bladder having first and second opposed ends, said first end sealingly attached to said first free end, said second end sealingly attached to said second free end; and
- a light transmissive liquid completely filling the cavity of said bladder for transmitting light signals between said first and second ends.

9. Apparatus for measuring relative movement between first and second members comprising:
- first fiber optic means on the first member having an index of refraction and adapted to transmit an optical signal from an optical signal generating means, said first fiber optic means having a longitudinal axis and a first free end;
- second fiber optic means on the second member having an index of refraction substantially similar to said first fiber optic means adapted to transmit an optical signal to optical signal receiving means, said second fiber optic means having a longitudinal axis and a second free end;
- flexible coupling means joining said first and second free ends, said coupling means being light transmissive and having substantially the same index of refraction as said first and second fiber optic means, wherein said flexible coupling means includes a flexible tubular bladder having first and second opposed ends, said first end sealingly attached to said first free end, said second end sealingly attached to said second free end and a light transmissive liquid completely filling the cavity of said bladder for transmitting light signals between said first and second ends;
- said first and second fiber optic means being relatively movable between first and second extreme positions;
- whereby, in the first extreme position, with the longitudinal axes of said first and second fiber optic means being aligned, an optical signal of maximum magnitude is received by the optical signal receiving means from the optical signal generating means via said first fiber optic means, said optical coupling means, and said second fiber optic means; and
- whereby, in the second extreme position with the longitudinal axes of said first and second fiber optic means being misaligned, no optical signal is received by the optical signal receiving means.

10. Apparatus as set forth in claim 9 wherein, in the second extreme position, the longitudinal axes of said first and second fiber optic means are parallel and mutually translationally displaced so that said projected surfaces of said first and second fiber optic means are non-extensive.

11. Apparatus as set forth in claim 9 wherein, in the second extreme position, the longitudinal axes of said first and second fiber optic means are mutually angularly displaced so that said projected surfaces of said first and second fiber optic means are non-extensive.

12. Apparatus for measuring pressure comprising:
- optical signal generating means;
- first fiber optic means having an index of refraction and adapted to transmit an optical signal from said optical signal generating means, said first fiber optic means having a first free end distant from said optical signal generating means;
- optical signal receiving means distant from said optical signal generating means;
- second fiber optic means having an index of refraction substantially similar to said first fiber optic means adapted to transmit an optical signal to said optical signal receiving means, said second fiber optic means having a second free end distant from said optical signal receiving means;
- flexible optical coupling means joining said first and second free ends, said optical coupling means being light transmissive and having substantially the same index of refraction as said first and second fiber optic means, said optical coupling means including:
- a flexible tubular bladder having first and second opposed ends, said first end sealingly attached to said first free end, said second end sealingly attached to said second free end; and
- a light transmissive liquid completely filling the cavity of said bladder for transmitting light signals between said first and second ends;
- operating means for deforming said bladder to thereby attenuate light signals being transmitted through said light transmissive liquid, said operating means including:
- a housing encompassing said outer peripheral surface of said bladder, said housing defining an interior space; and
- a source of pressurized fluid for selective introduction into the interior space for imparting a pressure against the outer peripheral surface of said bladder and thereby selectively reducing the cross sectional area of the cavity therein to a desired percentage of the initial cross sectional area, the magnitude of the optical signal received by said optical signal receiving means being a function of the pressure applied to the interior space.

13. An optical coupler as set forth in claim 1 wherein said operating means includes an elongate member having opposed ends and being wrapped around said outer peripheral surface to form a loop engaged therewith;
- whereby said light transmissive fluid biases said interior surface to increase the cross sectional area of the cavity; and
- whereby movement of said opposed ends in opposite directions reduces the size of said loop thereby reducing the cross sectional area of the cavity against the bias of said light transmissive fluid.

* * * * *